United States Patent

Meier

[11] Patent Number: 5,775,804
[45] Date of Patent: Jul. 7, 1998

[54] DOUGH PORTIONING MACHINE

[75] Inventor: Alexander Meier, Dürrwangen, Germany

[73] Assignee: Werner & Pfleiderer Lebensmitteltechnik GmbH, Dinkelsbühl, Germany

[21] Appl. No.: 927,490

[22] Filed: Sep. 11, 1997

[30] Foreign Application Priority Data

Sep. 28, 1996 [DE] Germany ............ 196 40 176.3

[51] Int. Cl.⁶ .................. A21C 3/00; A21C 5/00; A21C 7/06; A21D 6/00
[52] U.S. Cl. .................. 366/76.8; 99/472; 99/485; 366/76.5; 425/99; 425/147; 425/238; 425/333
[58] Field of Search ................ 99/352–355, 357, 99/443 C, 462, 467, 472, 484, 485; 366/76.5, 76.8, 76.9, 70, 77, 93, 100, 41, 300, 155.1, 142, 191; 425/135, 168, 238–240, 96, 99, 333, 363, 307, 311, 147, 169, 321, 203, 233–236, 812; 426/231, 496, 503; 222/272, 281, 152

[56] References Cited

U.S. PATENT DOCUMENTS

| | | |
|---|---|---|
| 1,730,394 | 10/1929 | Tessin . |
| 3,125,039 | 3/1964 | Haug et al. . |
| 3,733,058 | 5/1973 | Konig ............ 366/76.8 |
| 3,738,617 | 6/1973 | Madonia .......... 366/76.9 |
| 3,752,448 | 8/1973 | Madonia ......... 425/238 X |
| 3,785,623 | 1/1974 | Konig ............ 366/76.8 |
| 3,927,611 | 12/1975 | Papalexis et al. ...... 99/472 |
| 4,211,492 | 7/1980 | Konig et al. ....... 366/76.5 |
| 4,661,364 | 4/1987 | Campbell ......... 426/496 |
| 5,007,820 | 4/1991 | Schwab et al. ...... 425/333 |
| 5,123,830 | 6/1992 | Papalexis ......... 425/307 |
| 5,227,174 | 7/1993 | Konig ............ 425/147 |
| 5,242,698 | 9/1993 | Knost et al. . |
| 5,283,074 | 2/1994 | Campbell ......... 366/85 X |
| 5,330,344 | 7/1994 | Konig ............ 425/321 |

FOREIGN PATENT DOCUMENTS

| | | |
|---|---|---|
| 1 256 172 | 12/1967 | Germany . |
| 29 32 073 | 1/1984 | Germany . |
| 34 05 977 | 11/1984 | Germany . |
| 38 26 934 | 3/1989 | Germany . |
| 659147 | 10/1951 | United Kingdom . |
| WO 91/12723 | 9/1991 | WIPO . |

Primary Examiner—Timothy F. Simone
Attorney, Agent, or Firm—Browdy and Neimark

[57] ABSTRACT

A dough portioning machine comprises a metering chamber with a metering piston which is displaceable therein. The metering piston is provided with a degassing channel which is formed in the piston wall and to which a cleaning pin in the cylindrical wall of the metering chamber can be allocated.

7 Claims, 2 Drawing Sheets

DOUGH PORTIONING MACHINE

BACKGROUND OF THE INVENTION

1. Field of the Invention

The invention relates to a dough portioning machine.

2. Background Art

In dough portioning machines which are dough portioning and kneading machines conventionally, the dough is sucked from a dough hopper into a conveying chamber, from where it is forced into metering chambers by means of a conveying piston. Metering pistons are disposed in the metering chambers, by means of which a portioned quantity of a given volume is discharged as a dough piece. During the suction, air is sucked in too, which leads to inaccuracies in the weight of the dough piece and moreover to reduced quality in the finished baked product, air bubbles breaking up and marring the surface of the baked product. Corresponding impairment may also result from gasses produced by fermentation in the dough. At the beginning, these gasses are finely dispersed in the dough; however, when the dough is moved and formed in the dough portioning machine, greater gas bubbles are produced, which have the same drawbacks as air pockets when they get into the metering chamber. In order for the metering chambers to be filled entirely in spite of the presence of greater air or gas inclusions, correspondingly higher pressure must be exercised by the conveying piston, which again leads to impairment of the dough itself.

So as to avoid or at least attenuate the disadvantageous effects of air and gas inclusions in the metering chambers, various measures of deairing have become known. DE 34 05 977 C1 teaches to let the gasses included in the metering chambers escape through a comparatively great clearance of the metering piston or through deairing grooves on the circumference of the metering piston.

It is further known from U.S. Pat. No. 1,730,394 to provide needles in the metering chamber, which are disposed axially and cut into the dough, allowing gasses to escape along these needles and through deairing channels in the metering piston.

In a dough portioning machine known from German published examined patent application 12 56 172, which has a metering-chamber slide valve movable to reciprocate on a horizontal level, the metering chamber comprises deairing grooves on its side neighboring the conveying chamber.

Furthermore, DE 34 05 977 C1 teaches, in a dough portioning machine comprising a slide valve, which is movable up and down before a conveying chamber, and at least one metering chamber on the upper side of the conveying chamber, to provide a gap between the latter's frontal opening and the slide valve, the gap connecting the interior of the conveying chamber with the atmosphere at least in the upper position of the slide.

All the known designs, in particular the designs having a rotary slide valve, have in common that the grooves, channels and the like for the discharge of air or gas inclusions clog with dough very rapidly during operation, thus quickly losing the effect expect from them. This results in inaccurate dough weights or frequent interruptions of operation in order for the channels to be freed from the clogged and hardened dough.

SUMMARY OF THE INVENTION

It is the object of the invention to embody a dough portioning machine in such a way that reliable degassing of the dough is ensured.

According to the invention, this object is attained in a dough portioning machine comprising at least one dough hopper; a conveying chamber disposed downstream of the dough hopper; a conveying piston disposed displaceably in the conveying chamber; at least one metering chamber, which is disposed downstream of the conveying chamber and which is movable between a first position open towards the conveying chamber and a second position free from the conveying chamber; a metering piston, which is disposed displaceably in each metering chamber and which partially frees the metering chamber in the latter's first position and which empties the metering chamber in the latter's second position; a degassing device formed in the vicinity of the metering piston, and a cleaning device allocated to the degassing device. Reliable degassing is achieved due to the fact that a degassing device is provided in the vicinity of the metering piston, a cleaning device being allocated to the degassing device. Consequently, the invention leaves the way of obtaining reliable degassing by the ever varying arrangement of degassing channels, which has not been successful; the invention additionally provides for a cleaning device for the cleaning of the degassing device.

Further features, advantages and details of the invention will become apparent from the ensuing description of an exemplary embodiment, taken in conjunction with the drawing.

DESCRIPTION OF THE PREFERRED EMBODIMENT

Figure 1:
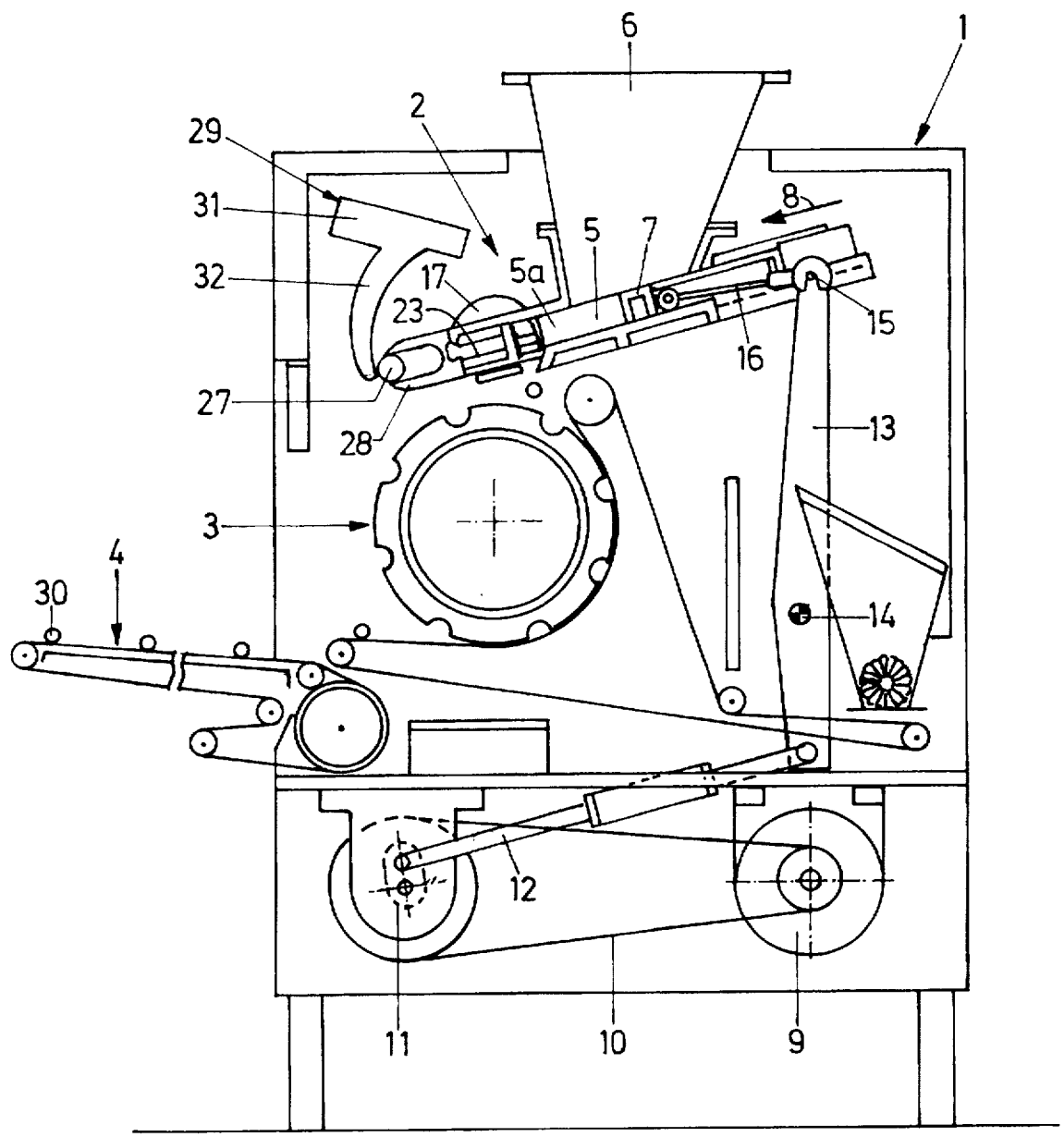
FIG. 1 is a diagrammatic, vertical illustration, broken open, of a dough portioning and kneading machine.

The dough portioning and kneading machine seen in FIG. 1 has an approximately cuboid frame 1, in which a dough portioning device 2, a kneading device 3 and a conveying device 4 are disposed.

The dough portioning device 2 comprises a conveying chamber 5, on which a dough hopper 6 is mounted. In the conveying chamber 5, a conveying piston 7 is displaceable in the conveying direction 8 and against the conveying direction 8. Driving the conveying piston 7 is effected by a driving motor 9 for instance in the form of a geared motor disposed in the lower portion of the frame 1. From the driving motor 9, a crank drive 11 works via a chain transmission 10. A connecting rod 12 is reciprocatingly driven by the crank drive 11, the connecting rod 12 being articulated to the end of a double-aimed pivoted lever 13. The pivoted lever 13 can be pivoted about a rock shaft 14 mounted in the frame 1. The end, opposite to where the connecting rod 12 is articulated, of the pivoted lever 13 is articulated to a connecting rod 16 by means of a pivoted connection 15, the connecting rod 16 again being articulated to the conveying piston 7. During a rotation of the crank drive 11, the conveying piston 7 performs an entire stroke in the conveying direction 8 and a corresponding return stroke against the conveying direction 8.

Figure 2:
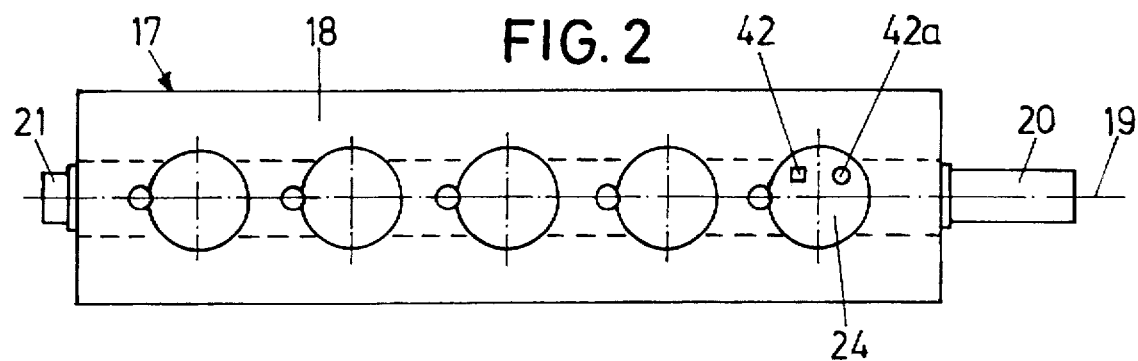
FIG. 2 is a plan view of a rotary slide valve.
Figure 3:
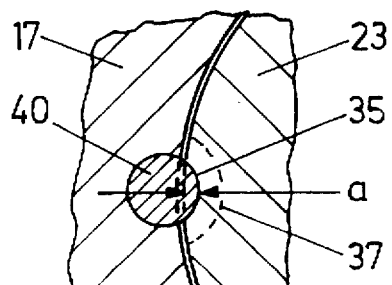
FIG. 3 is a partial view of the rotary slide valve of FIG. 2 on a strongly enlarged scale.
Figure 4:
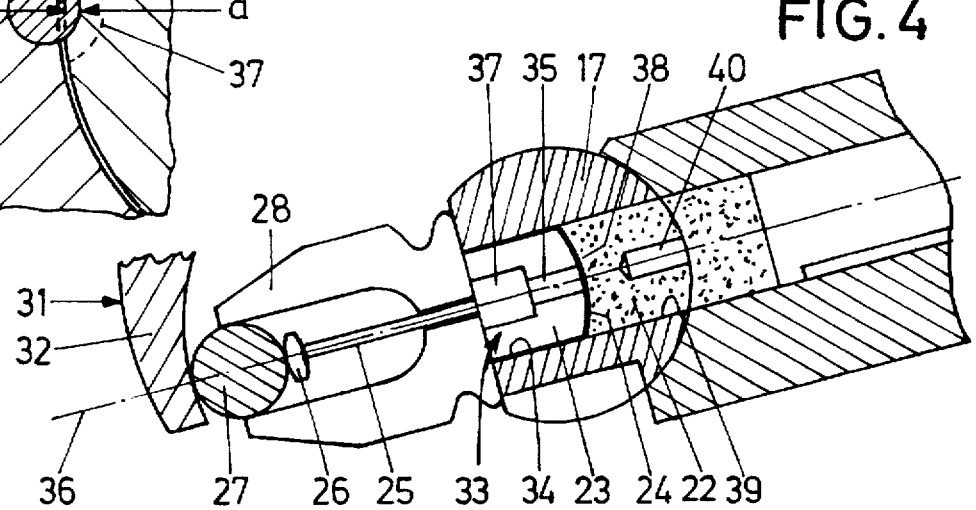
FIG. 4 is a partial cross-section of the rotary slide valve with a conveying chamber in a filling position of the rotary slide valve.

In the conveying direction 8, the conveying chamber 5 is followed by a rotary slide valve 17, details of which are seen in FIGS. 2 to 4. Substantially, it comprises a cylinder 18 with bearing pins 20, 21 disposed concentrically of the central axis 19 and by means of which the rotary slide valve 17 is mounted in the flame 1 pivotally about its central axis 19. The drive of the rotary slide valve 17 is derived from the crank drive 11 in a manner not shown. Several metering chambers 22 of identical diameter are formed in the rotary slide valve 17. In the cylindrical metering chambers 22, which are open at both ends, provision is made for metering pistons 23 which have a piston area 24, the curvature of which corresponds to the curvature of the rotary slide valve 17, i.e. of the cylinder 18. The metering pistons 23 have a slide 25 which projects from the rotary slide valve 17 and which, at its end opposite to the piston area 24, bears against a drum controller 27 by a pressure pad 26. The drum controller 27 is lodged in a fork 28 mounted on the rotary slide valve 17. In this fork 28, it is displaceable radially to the central axis 19 of the rotary slide valve 17. The dimension of the stroke of the metering piston 23 is given by a weight setting device 29, by means of which the weight of a dough piece 30 is determined which has been portioned in a metering chamber 22. The weight setting device 29 comprises a pair of curved segments 32 on an adjustable base body 31, the curved segments 32 bearing against the drum controller 27. When the rotary slide valve 17 is pivoted about its central axis 19, then the drum controller 27 is guided along the curved segments 32, as a result of which the metering pistons 23 are able to perform a stroke. Dough portioning and kneading machines of the generic type as described so far, are known for instance from U.S. Pat. No. 5,242,698 and they are commercially available.

Each metering piston 23 is provided with a degassing device 33 which comprises a degassing channel 35 formed in the cylindrical piston wall 34 of the metering piston 23 and extending from the piston area 24 in the direction towards the slide 25. This channel runs parallel to the central axis 36 of the metering piston 23. As seen in FIG. 3, the degassing channel 35 is very flat, having approximately the cross-section of a segment of a circle with a height a of some tenths of a millimeter. The degassing channel 35, which is open towards the piston area 24, extends over only part of the piston skirt 34 of each metering piston 23. It has a length b of for example 10 to 20 mm. It then opens into a recess 37, which is formed in the piston skirt 34 and the cross-sectional area of which considerably exceeds that of the degassing channel 35. The recess 37 ends open in the vicinity of the slide 25. A cleaning pin 40, which is in alignment with the degassing channel 35, is disposed at the filling and discharging mouth 38 of the metering chamber 22 in the latter's cylindrical wall 39. It projects into the metering chamber 22 by the cross-section of the height a and the length b by which the degassing channel 35 stands back. During a stroke of the metering piston 23 in the discharging direction 41, i.e. in the direction towards the filling and discharging mouth 38 of the metering chamber 22, the degassing channel 35 is pushed over the cleaning pin 40 so that any dough located in the degassing channel 35 is pushed out of the latter and into the recess 37. The degassing channel 35 is cleaned. Of course, several degassing channels 35 of this type having associated cleaning pins 40 can be provided along the circumference of a metering piston 23, the at least one degassing channel 35 in any case being disposed at a place where gas collects preferably in the metering chamber 22. Of course the degassing channel 35 can also be a rectangular groove cut into the metering piston 23 for instance by means of a disk milling cutter. The cleaning pin 40 would have to be adapted correspondingly.

FIG. 2, on the right, illustrates a degassing channel 42 of square cross-section and a degassing channel 42a of circular cross-section in the metering piston 23, these channels 42, 42a running from the piston area 24 through the entire metering piston 23. These degassing channels 42, 42a likewise cooperate with a cleaning pin of matching cross-section (not shown).

The structure and function of the kneading device 3 and of the conveying device 4 are generally known for instance from U.S. Pat. No. 3,125,039 and U.S. Pat. No. 5,242,698, to which reference is made.

The machine illustrated and described works as follows:

A dough 43 is in the dough hopper 6. During a return stroke of the conveying piston 7 against the conveying direction 8 and into the position seen in FIG. 1, the dough 43 located in the dough hopper 6 is sucked into the conveying chamber 5, filling the latter up as illustrated in FIG. 1. Upon a conveying stroke of the conveying piston 7 in the opposite direction, i.e. in the conveying direction 8, the conveying piston 7 is displaced in the direction towards the rotary slide valve 17. When reaching the closed conveying chamber section 5a which is no longer open towards the dough hopper 6, the conveying piston 7 closes the conveying chamber 5. The rotary slide valve 17 is in a position seen in FIGS. 1 and 4, in which the metering chambers 22 are open towards the conveying chamber 5. By means of the conveying stroke of the conveying piston 7 the metering chambers 22 are filled with dough 43, the metering pistons 23 being displaced until the drum controller 27 which rests on the slides 25 bears against the curved segments 32. In this way the stroke of the metering pistons 23 is defined and the volume, and thus the weight, of the dough pieces 30 is determined. Since, in this position seen in FIG. 4, the respective degassing channel 35 does not overlap the associated cleaning pin 40, i.e. is not filled by the latter, any gas contained in the dough 43 and set free can flow off through the respective degassing channel 35 and the downstream recess 37.

Figure 5:
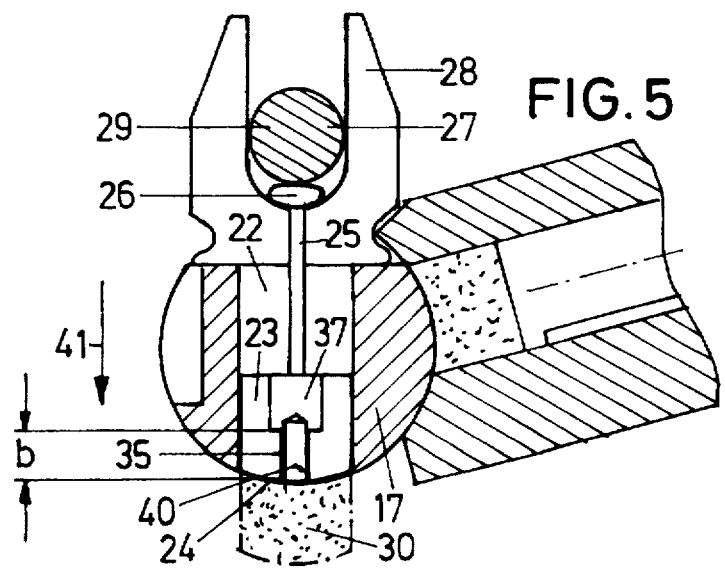
FIG. 5 is an illustration of the rotary slide valve with the conveying chamber in a discharging position of the rotary slide valve.

During the ensuing return stroke of the conveying piston 7, the rotary slide valve 17 is pivoted—clockwise in FIG. 5—as a result of which the drum controller 27 rolls along the curved segments 32 and moves the metering pistons 23 into the metering chambers 22 in such a way that the portioned dough pieces 30 located in the metering chambers 22 are discharged downwards by the piston areas 24 and fall into the kneading device 3.

During this discharching motion, the respective degassing channel 35 is pushed over the cleaning pin 40 so that any dough remaining in the degassing channel 35 is pushed into the recess 37. This recess 37 must be cleaned from time to time at prolonged time intervals.

The dough pieces 30 are conventionally kneaded in the kneading device 3 and then delivered by the conveying device 4 for instance to a downstream fermenter.

What is claimed is:

1. A dough portioning machine comprising:
    at least one dough hopper (6)
    a conveying chamber (5) disposed downstream of the dough hopper (6)
    a conveying piston (7) disposed displaceably in the conveying chamber (5)
    at least one metering chamber (22), which is disposed downstream of the conveying chamber (5) and which is movable between a first position open towards the conveying chamber (5) and a second position free from the conveying chamber (5)

a metering piston (23), which is disposed displaceably in each metering chamber (22) and which partially frees the metering chamber (22) in the latter's first position and which empties the metering chamber (22) in the latter's second position a degassing device (33) formed in the vicinity of the metering piston (23), and a cleaning device allocated to the degassing device (33).

2. A dough portioning machine according to claim 1, wherein the degassing device (33) comprises at least one degassing channel (35, 42, 42a) in the metering piston (23).

3. A dough portioning machine according to claim 2, wherein the cleaning device comprises a cleaning pin (40) which pushes through each degassing channel (35, 42, 42a) during a stroke of the metering piston (23).

4. A dough portioning machine according to claim 2, wherein at least one degassing channel (35) is formed in a piston wall (34) of the metering piston (23).

5. A dough portioning machine according to claim 4, wherein the degassing channel (35) has a height a of some tenths of a millimeter.

6. A dough portioning machine according to claim 4, wherein a cleaning pin (40) is provided in the cylindrical wall (39) of the metering chamber (22), the cleaning pin (40) being in alignment with the associated degassing channel (35) and reaching into the degassing channel (35) in the second position of the metering chamber (22).

7. A dough portioning machine according to claim 4, wherein the at least one degassing channel (35) extends over part of the length of the metering piston (23) and opens into a recess (37) which has a cross-section considerably exceeding that of the degassing channel (35).

* * * * *